United States Patent [19]
Fournier

[11] Patent Number: 5,934,553
[45] Date of Patent: *Aug. 10, 1999

[54] THERMOSTATIC VALVE

[75] Inventor: Walter L. Fournier, Rochester, Mich.

[73] Assignee: Chrysler Corporation, Auburn Hills, Mich.

[*] Notice: This patent issued on a continued prosecution application filed under 37 CFR 1.53(d), and is subject to the twenty year patent term provisions of 35 U.S.C. 154(a)(2).

[21] Appl. No.: 08/907,801

[22] Filed: Aug. 8, 1997

[51] Int. Cl.⁶ .......................................................... F01P 7/14
[52] U.S. Cl. ........................ 236/34.5; 137/219; 236/93 A
[58] Field of Search ..................................... 137/219, 220; 236/34, 34.5, 93 A, 99 J, 99 K, 100

[56] References Cited

U.S. PATENT DOCUMENTS

| | | | |
|---|---|---|---|
| 2,133,983 | 10/1938 | Gaston | 137/219 |
| 2,592,474 | 4/1952 | Schnyder | 137/219 |
| 2,770,440 | 11/1956 | Woods | 251/28 |
| 2,891,730 | 6/1959 | Wood et al. | 236/34 |
| 2,954,930 | 10/1960 | Linder | 236/34.5 |
| 3,167,249 | 1/1965 | Moosmayer et al. | 236/34 |
| 3,207,436 | 9/1965 | Jones | 236/34 |
| 3,233,829 | 2/1966 | Kelly | 236/34 |
| 3,322,138 | 5/1967 | Backman | 137/219 |
| 3,334,647 | 8/1967 | Whitelaw | 137/219 |
| 4,141,534 | 2/1979 | Goga et al. | 137/219 |
| 4,473,091 | 9/1984 | Stoves | 137/219 |
| 4,565,210 | 1/1986 | Heine et al. | 137/219 |
| 5,011,074 | 4/1991 | Kline | 236/12.2 |
| 5,292,064 | 3/1994 | Sauer et al. | 236/34.5 |
| 5,452,852 | 9/1995 | Marckel | 236/34.5 |

*Primary Examiner*—William E. Tapolcai
*Attorney, Agent, or Firm*—Jennifer M. Stec

[57] ABSTRACT

A thermostatic valve for controlling fluid flow from a high-temperature source to a low-temperature source. The thermostatic valve includes a first end which, during use of the valve, is exposed to fluid from the high-temperature source and a second end which, during use of the valve, is exposed to fluid from the low-temperature source. The valve also includes a valve seat member having a valve seat and a valve member having two ends and an exterior closure surface registrable with the valve seat. The valve member has a shape, except at its two ends, with only curves of greater than about 150°, so that fluid flowing past the valve member is caused to make only turns of less than about 30°. The thermostatic valve is useful for controlling coolant flow from an internal combustion engine block to a radiator. The valve member may have a shape formed of continuously-varying parabolic curves. The valve may further include an expansible-material housing, containing expansible material, at the first end of the valve. The expansible-material housing may be conical and pointed at the end facing the engine block.

12 Claims, 3 Drawing Sheets

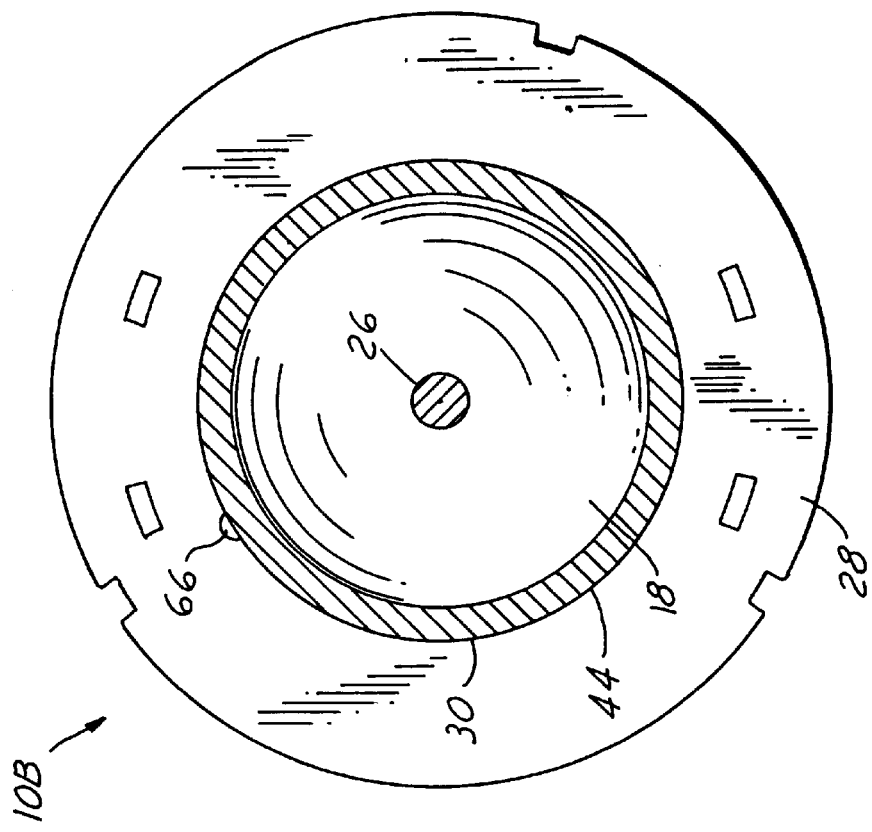
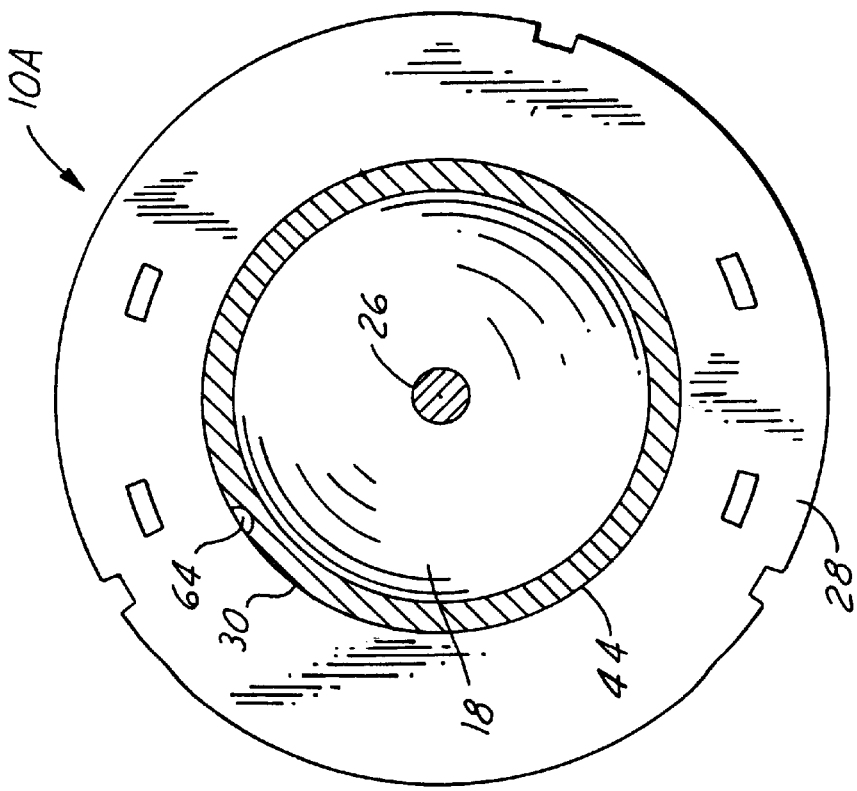

THERMOSTATIC VALVE

BACKGROUND OF THE INVENTION

1. Field of the Invention

The present invention relates generally to thermostatic valves and, more particularly, to thermostatic valves for controlling coolant flow in internal combustion engine blocks.

2. Description of the Related Art

To maintain a desirable temperature of an internal combustion engine block during operation of an engine, a thermostatic valve is used to control the flow of coolant from the engine block through a cooling system and back to the engine block. The thermostatic valve is typically designed to open when the temperature of the coolant in the engine block exceeds a critical temperature, such as 120° F., so that the hot coolant flows to a radiator where the coolant is cooled and returned to the engine block via a coolant pump. The thermostatic valve typically can open to varying degrees to maintain the temperature of the engine in the desired temperature range.

When the engine is turned off, the engine block cools and, typically, the thermostatic valve closes and circulation through the radiator is stopped. If the coolant on the radiator side of the valve remains hot, pressure inside the radiator can increase to undesirable pressures.

Current thermostatic valves serve to control the coolant flow adequately; however, the structure of the valves create large pressure drops in the coolant flow as they disturb the normal flow of and cause friction in the flowing coolant. For example, even though the thermostatic valve of U.S. Pat. No. 3,207,436 has been designed with a valve head having a smooth contour on one side, the valve head has a 90° corner, so that the coolant flowing past the valve head must turn 90°, which substantially disturbs the normal flow of the coolant, causing a large amount of pressure drop in the coolant flow.

It is, therefore, desirable to have available a thermostatic valve which causes a reduced level of pressure drop in the coolant flow relative to prior thermostatic valves. With a reduced level of pressure drop, a given coolant pump can provide an increased amount of coolant flow for improved cooling efficiency and/or a given coolant pump will have a longer service life since it does not have to work as hard as it does with prior thermostatic valves.

It is also desirable to have available a thermostatic valve which provides a small amount of "back flow" through the valve from the radiator to the engine block to relieve any build-up of pressure on the side of the radiator during shut-down of the engine. It would also be advantageous if the structure allowing the back flow was simple and inexpensive to provide on the valve.

It is, therefore, one object of the present invention to provide a thermostatic valve for controlling the coolant flow from an internal combustion engine block through a cooling system.

It is another object of the present invention to provide a thermostatic valve for controlling coolant flow in an internal combustion engine block which causes a reduced amount of pressure drop in the fluid flow relative to prior thermostatic valves.

It is yet another object of the present invention to provide a thermostatic valve for controlling coolant flow in an internal combustion engine block which has structure which allows back flow of the coolant through the valve from the radiator to the engine block, which structure is simple in design and inexpensive to include on the valve.

SUMMARY OF THE INVENTION

To achieve the foregoing objects, the present invention is a thermostatic valve for controlling fluid flow from a high-temperature source to a low-temperature source. The thermostatic valve includes a first end which, during use of the valve, is exposed to fluid from the high-temperature source and a second end which, during use of the valve, is exposed to fluid from the low-temperature source. The valve also includes a valve seat member having a valve seat and a valve member having two ends and an exterior closure surface registrable with the valve seat. The valve member has a shape, except at its two ends, with only curves of greater than about 150°, preferably, greater than about 160°, so that fluid flowing past the valve member is caused to make only turns of less than about 30°, or, preferably, less than about 20°.

The thermostatic valve of the present invention is useful for controlling coolant flow from an internal combustion engine block to a radiator. The valve member may have a shape formed of continuously-varying parabolic curves. The valve may further include an expansible-material housing, containing expansible material, at the first end of the valve. A preferred expansible-material housing is conical and pointed at the end facing the engine block.

Other objects, features, and advantages of the present invention will be readily appreciated as the same becomes better understood after reading the subsequent description taken in conjunction with the appendant drawings.

BRIEF DESCRIPTION OF THE DRAWINGS

FIGS. 5A and 5B are sectional views of the thermostatic valve of FIG. 1 showing alternative designs, the sections as cut along line 5—5 of FIG. 1 and viewed in the direction of the arrows.

DESCRIPTION OF THE PREFERRED EMBODIMENT(S)

Figure 1:
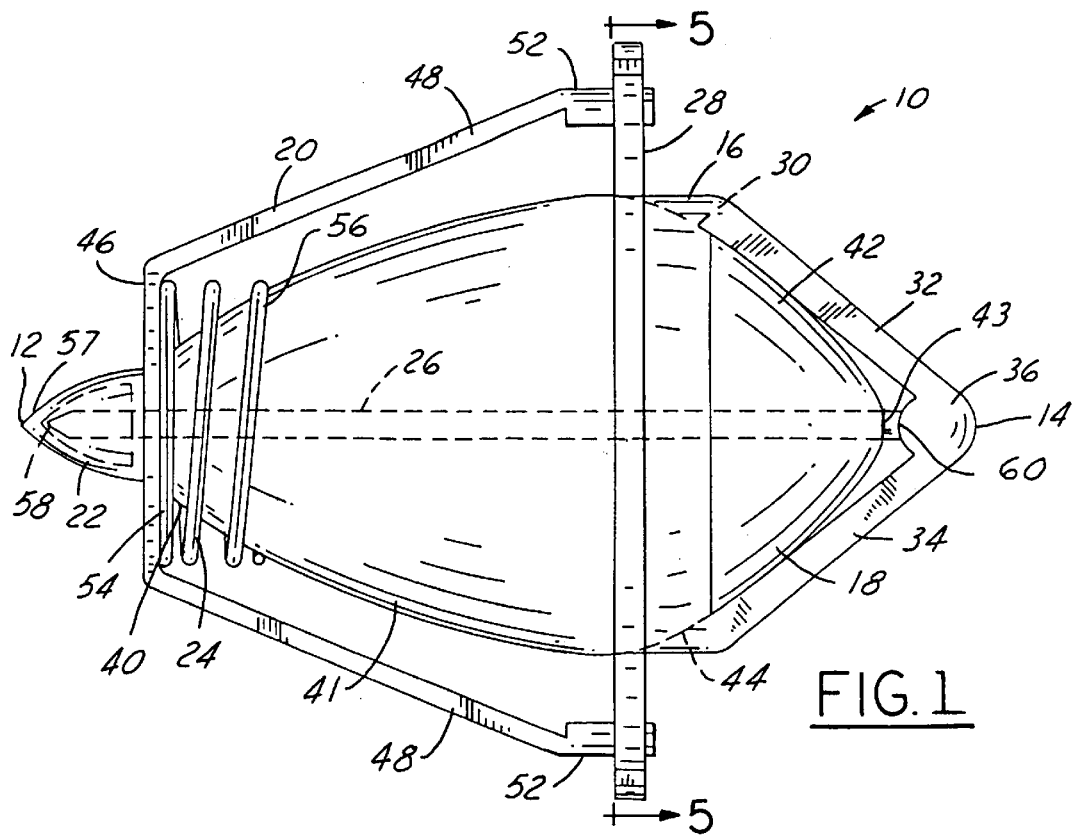
FIG. 1 is a side elevational view of a thermostatic valve according to the present invention, wherein the valve is in the closed position.

Referring to the Drawings, wherein like reference characters designate corresponding parts throughout the Figures thereof, the Figures depict a thermostatic valve generally indicated by reference numeral 10. Thermostatic valve 10 is useful for controlling fluid from a high-temperature source to a low-temperature source. A typical high-temperature source is an engine block in an internal combustion engine, with the corresponding low-temperature source being a radiator, and the corresponding fluid being coolant fluid. Thermostatic valve 10 includes end 12 which, during use in an internal combustion engine, is exposed to the coolant from the engine block and end 14 which, during use in an internal combustion engine, is exposed to the coolant leading to the radiator. End 12 may also be referred to as being on the "hot end" of thermostatic valve 10, and end 14 on the "cold end" of thermostatic valve 10.

Thermostatic valve 10 also includes valve seat member 16, valve member 18, support member 20, expansible-material housing 22, spring 24, and pin 26. All parts of valve 10 may be formed of metal, except for the expansible material and other (optional) materials inside expansible-material housing 22 which will be discussed hereinbelow.

Valve seat member 16 has retainer disk 28, valve seat 30, bridge members 32 and 34, and abutment 36. Retainer disk 28 is on the outside and concentric with valve seat 30. Retainer disk 28 and bridge members 32 and 34 may be better seen in FIG. 4 which shows thermostatic valve 10 as seen looking toward end 14.

Retainer disk 28 is present as a means for locking thermostatic valve 10 in an opening to the engine block and is sized to seal the opening closed so that coolant, in general, does not flow to the radiator until the valve opens. (A small amount of flow may occur through the valve even when the valve is closed, which will be discussed hereinbelow.) Bridge members 32 and 34 are connected to retainer disk 28 and abutment 36 and are present to secure abutment 36 in a stationary position.

Valve member 18 is an egg-shaped member having hot end 40, hot-side portion 41, cold-side portion 42, cold end 43, and exterior closure surface 44. Exterior closure surface 44 is registerable with valve seat 30. The outer diameter of cold-side portion 42 of valve member 18 converges more quickly from the middle section of valve member 18 to cold end 43 than does the outer diameter of hot-side portion 41 converge from the middle section to hot end 40. Valve member 18 may be of any generally curving shape and is preferably formed of continuously-varying parabolic curves, e.g., elliptic.

Figure 3:
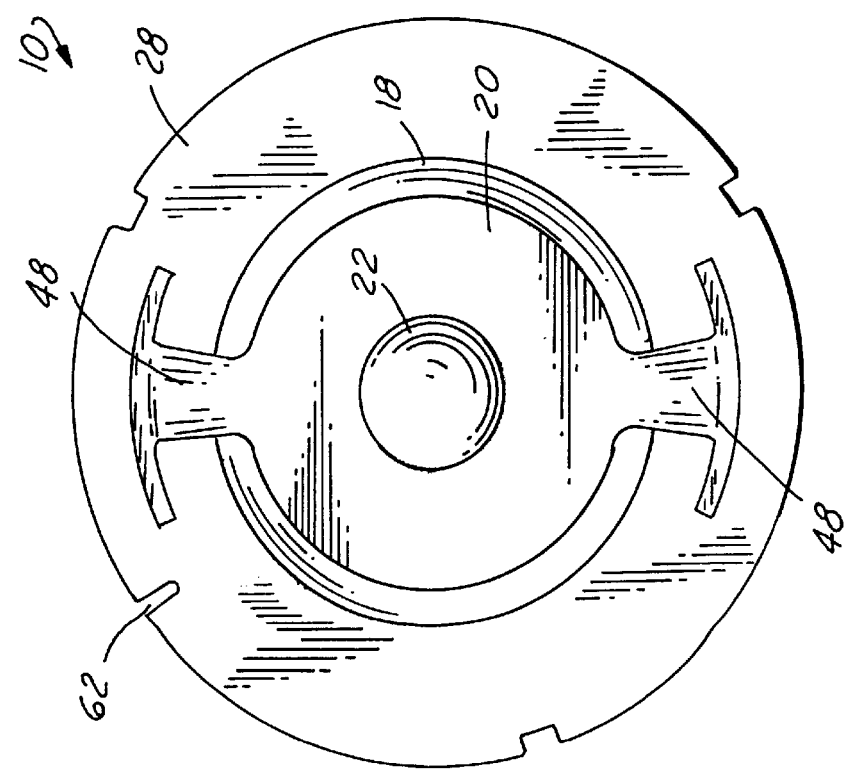
FIG. 3 is an elevational view of one end of the thermostatic valve of FIG. 1.

Support member 20 has circular plate 46 (as best seen in FIG. 3 which is an end view of thermostatic valve 10 as seen looking toward end 12) and support arms 48. Circular plate 46 has circular opening 50 therein. Support arms 48 are integral with circular plate 46 and extend to retainer disk 28 into which ends 52 of support arms 48 are riveted. Circular plate 46 is present to provide a stationary surface onto which one end of spring 24 rests.

Spring 24 is a helical spring having end 54 and end 56 and extends from circular plate 46 to a location on hot-side portion 41 of valve member 18. The precise location on hot-side portion 41 to which spring 24 extends depends on the diameter of end 56 of spring 24. When the engine block is cold, spring 24 maintains exterior closure surface 44 against valve seat 30.

Connected to hot end 40 of valve member 18 is expansible-material housing 22, formed of, e.g., copper, which contains an expansible material such as a wax mixture. Expansible-material housing 22 is conical, has two ends, and is pointed at the end which faces the coolant from the engine block. The insides of expansible-material housing 22 is shown in a simplified manner, containing only a wax mixture. Various other inner structures for expansible materials housings are well-known in the industry. Expansible-material housing 22 is conical has two ends, one being pointed end 57. Expansible-material housing 22 is completely closed except for an aperture (not shown) in one end thereof through which pin 26 slidably extends. Pin 26 extends through opening 50 in circular plate 46.

Pin 26 has end 58 and end 60 and slidably extends from inside expansible-material housing 22, through hot end 40 of valve member 18, through cold end 43 of valve member 18, to abutment 36. Washers or other means for sealing (not shown) may be used where pin 26 passes through valve member 18 to maintain a good seal against the flow of coolant. Washers or other means for sealing (also not shown) may be used where pin enters expansible-material housing 22 to seal the expansible material inside the housing.

FIG. 1 illustrates thermostatic valve 10 in the closed position which is the normal position when the engine block is cold. In the closed position, exterior closure surface 44 is seated against valve seat 30.

Figure 2:
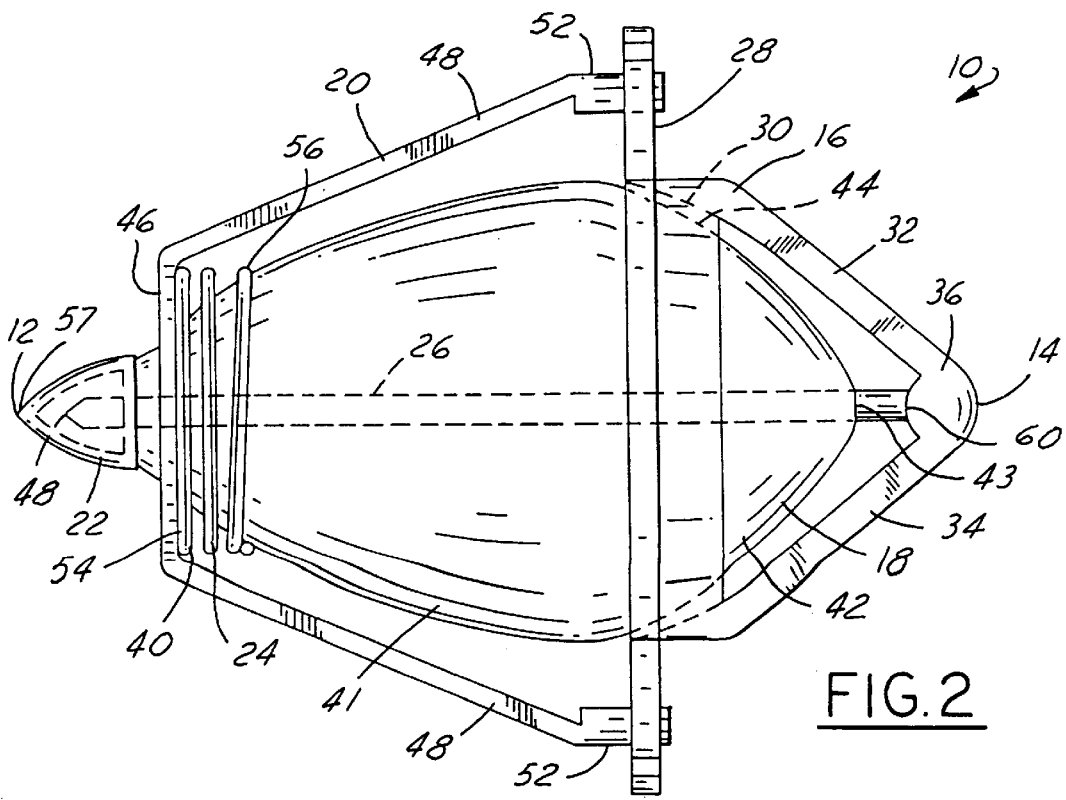
FIG. 2 is a side elevational view of the thermostatic valve of FIG. 1 shown in the open position.

FIG. 2 illustrates thermostatic valve 10 in the open position which is the normal position when the engine block exceeds a critical temperature, such as 120° F. To arrive at the open position, end 12 of thermostatic valve 10 has been exposed to coolant which has reached a critical elevated temperature. The hot coolant causes the expansible material inside expansible-material housing 22 to expand which forces pin 26 out of expansible-material housing 22 to some extent. However, since pin 26 is held stationary against abutment 36, expansible-material housing 22 is caused to move in the direction of end 12 of the valve, causing valve member 18 to also move in the direction of end 12, compressing the spring, and allowing exterior closure surface 44 to unseat from valve seat 30, thus, opening the valve.

The type of expansible material and the strength of the spring may be chosen to control the amount of the opening of the valve relative to the temperature in the engine block. The opening and closing operations of such a valve is well-known in the industry and is taught in U.S. Pat. Nos. 2,891,730 and 3,167,249, which patents are incorporated herein by reference.

The shape of valve member 18, except at ends 40 and 43, is such that its "curves" are all greater than about 150° so that, when coolant flows through valve 10, the coolant makes no turns greater than about 30°. In other words, the included angle between any two coplanar lines tangent to the outside surface of valve member 18 intermediate its two ends exceeds 150° and the fluid path through valve 10, around the outside surface of valve member 18 has no turns greater than about 30°. Preferably, except at ends 40 and 43, the "curves" of valve member 18 are all greater than about 160°, so that coolant makes no turns greater than about 20°. End 40 of valve member 18, which is connected to expansible-material housing 22, is designed with expansible-material housing 22 to, together, have all curves (except at the ends) greater than about 150°, and preferably, greater than about 160°.

End 57 of expansible-material housing 22 is angular, preferably, at most about 90°, so that coolant flowing toward end 57 maintains a close to normal and relatively undisturbed flow. End 43 of valve member 18 is preferably at most about 110°, preferably, at most about 90°, also to maintain a close to normal and relatively undisturbed flow pattern in the coolant.

The effect of having a valve member and expansible-material housing with such shapes leads to fluid flow which has reduced disturbance relative to flow through prior valves. As a result, valve 10 creates less of a pressure drop in the coolant relative to prior thermostatic valves, thereby having increased flow with a given coolant pump providing improved cooling efficiency and/or extending the service life of the coolant pump.

Valve 10 is also equipped with structure to allow back flow of coolant, when the engine block is cool. Three alternative structures for back flow are shown. The three alternative structures allow only enough flow for pressure relief but not so much flow that the engine block cannot reach the desired warm temperature.

Figure 4:
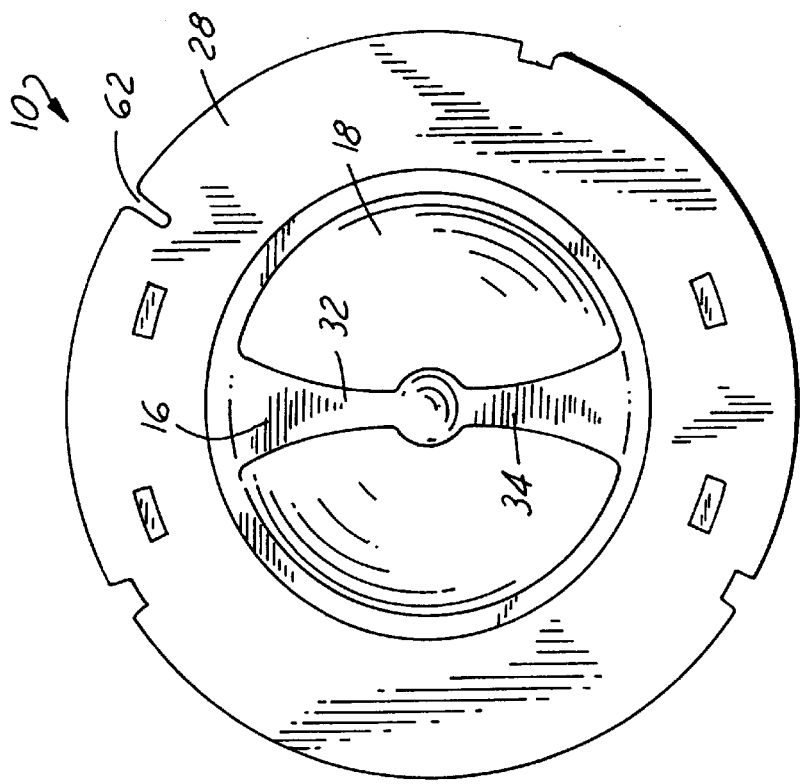
FIG. 4 is an elevational view of the other end of the thermostatic valve of FIG. 1.

One structure which allows back flow is depression 62 in the outer edge of retainer disk 28 as shown in FIGS. 3 and 4. A small amount of leakage is allowed from one side of valve 10 through the other side of valve 10 through depression 62.

FIGS. 5A and 5B illustrate two other structures which allow back flow through valves 10A and 10B, respectively, of the present invention. FIGS. 5A and 5B are cross sectional views of FIG. 1, as cut along line 5—5 and seen in the direction of the arrows. FIG. 5A shows valve 10A with channel 64 in exterior closure surface 44 of valve member 18. FIG. 5B shows valve 10B with channel 66 in valve seat 30. Either channel allows some leakage from one side of the valve to the other side of the valve.

Accordingly, the thermostatic valve of the present invention is suitable for controlling the coolant flow from an internal combustion engine block through a cooling system and causes a reduced amount of pressure drop in the fluid flow relative to prior thermostatic valves. The thermostatic valve of the present invention also may have structure which allows back flow of the coolant through the valve from the radiator to the engine block, which structure is simple in design and inexpensive to include on the valve.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced otherwise than as specifically described.

What is claimed is:

1. A thermostatic valve for controlling fluid flow from a high-temperature source to a low-temperature source, comprising:
    a first end which, during use of the valve, is exposed to fluid from the high-temperature source;
    a second end which, during use of the valve, is exposed to fluid from the low-temperature source;
    a valve seat member on the valve, the valve seat member having a valve seat; and
    a generally egg-shaped valve member having two ends and an exterior closure surface registrable with the valve seat, the generally egg-shaped valve member having a shape, except at its two ends, with only curves of greater than about 150° so that fluid flowing past the generally egg-shaped valve member is caused to make only turns of less than about 30°, wherein said generally egg-shaped valve member is movable relative to said valve seat and is biased by a spring into engagement with said valve seat.

2. The thermostatic valve of claim 1, wherein the valve member is shaped with only curves of greater than about 160° so that fluid flowing past the valve member is caused to make turns of less than about 20°.

3. The thermostatic valve of claim 1, wherein the valve member is a shape formed of continuously-varying parabolic curves.

4. The thermostatic valve of claim 1, wherein the closure surface of the valve member bears a channel so that some fluid flow is allowed through the valve when in the closed position.

5. The thermostatic valve of claim 1, wherein the valve seat bears a channel so that some fluid flow is allowed through the valve when the valve is in the closed position.

6. The thermostatic valve of claim 1, wherein the valve seat member has a retainer disk on the outside of and concentric with the valve seat and the retainer disk has a depression in the outer edge thereof to allow some fluid flow through the valve when the valve is in the closed position.

7. The thermostatic valve of claim 1, wherein the high-temperature source is an engine block of an internal combustion engine, the low-temperature source is a radiator, and the fluid is coolant fluid.

8. A thermostatic valve for controlling fluid flow from a high-temperature source to a low-temperature source, comprising:
    a first end which, during use of the valve, is exposed to fluid from the high-temperature source;
    a second end which, during use of the valve, is exposed to fluid from the low-temperature source;
    a valve seat member on the valve, the valve seat member having a valve seat; and
    a valve member having two ends and an exterior closure surface registrable with the valve seat, the valve member having a shape, except at its two ends, with only curves of greater than about 150° so that fluid flowing past the valve member is caused to make only turns of less than about 30°, wherein said valve member is movable relative to said valve seat and is biased by a spring into engagement with said valve seat;
    further comprising an expansible-material housing at the first end of the valve, the housing containing expansible material and having a shape so that fluid flowing past the housing is caused to only make turns of less than about 30°.

9. The thermostatic valve of claim 8, wherein the expansible-material housing is conical and has an end facing the high-temperature source, the housing being pointed at the end facing the high-temperature source.

10. A thermostatic valve for controlling coolant flow from an internal combustion engine block to a radiator, comprising:
    a first end which, during use of the valve, is exposed to coolant from the engine block;
    a second end which, during use of the valve, is exposed to coolant from the radiator;
    a valve seat member on the valve, the valve seat member having a valve seat;
    a valve member having two ends and an exterior closure surface registrable with the valve seat, the valve member having a shape formed of continuously-varying parabolic curves and, except at its two ends, the valve member is shaped with only curves of greater than about 160° so that fluid flowing past the valve member is caused to make only turns of less than about 20°; and
    an expansible-material housing at the first end of the valve, the housing having an end facing the engine block, the housing being conical and pointed at the end facing the engine block, the housing containing expansible material.

11. A thermostatic valve for controlling fluid flow in a fluid passage, comprising:
- a support structure for supporting said valve in the fluid passage;
- a valve seat supported by said valve structure;
- a generally egg-shaped valve member having an exterior closure surface, registrable with said valve seat, said generally egg-shaped valve member being movable relative to said valve seat;
- a spring for biasing said generally egg-shaped valve member against said valve seat; and
- means, responsive to an increase in temperature, for moving said generally egg-shaped valve member away from said valve seat.

12. The thermostatic valve according to claim 11, wherein said support structure includes a circular plate supported by a plurality of support arms and wherein said spring is seated between said circular plate and an end of said generally egg-shaped valve member.

* * * * *